United States Patent [19]

Ikemura et al.

[11] Patent Number: 4,643,246
[45] Date of Patent: Feb. 17, 1987

[54] BAY WINDOW WITH VENTILATOR

[75] Inventors: Akio Ikemura, Kurobe; Minoru Kajiki, Toyama, both of Japan

[73] Assignee: Yoshida Kogyo K. K., Tokyo, Japan

[21] Appl. No.: 753,585

[22] Filed: Jul. 10, 1985

[30] Foreign Application Priority Data

Jul. 10, 1984 [JP] Japan ............................ 59-104177[U]

[51] Int. Cl.⁴ ................................................. F24D 5/10
[52] U.S. Cl. ........................................ 165/54; 52/201; 98/94.1; 165/7; 165/909
[58] Field of Search ...................... 52/201; 98/31, 33.1, 98/88.1, 94.1; 165/7, 10, 47, 48.1, 53, 54, 901, 909

[56] References Cited

U.S. PATENT DOCUMENTS

| | | | |
|---|---|---|---|
| 3,977,466 | 8/1976 | Johansson | 165/909 X |
| 4,009,546 | 3/1977 | Buck, Jr. | 52/201 |
| 4,183,398 | 1/1980 | Ehrke | 165/7 X |
| 4,523,716 | 6/1985 | Gartner | 98/31 |

FOREIGN PATENT DOCUMENTS 59-74443  4/1984  Japan .

Primary Examiner—Harold Joyce
Attorney, Agent, or Firm—Hill, Van Santen, Steadman & Simpson

[57] ABSTRACT

A bay window includes a frame assembly composed of an inner head, an inner transom, an inner sill, an outer head, an outer transom, an outer sill, a middle horizontal panel interconnecting the inner and outer transoms, and a lower horizontal panel interconnecting the inner and outer sills. A window unit is disposed between the outer head and the outer transom, and a housing or bay window cupboard is disposed between the middle and lower horizontal panels. A ventilator is accommodated in the housing and has an air inlet port communicating with air inlets defined in the inner sill and opening into a house interior space, and an air outlet port communicating with air outlets defined in the inner transom and opening into the house interior space.

1 Claim, 4 Drawing Figures

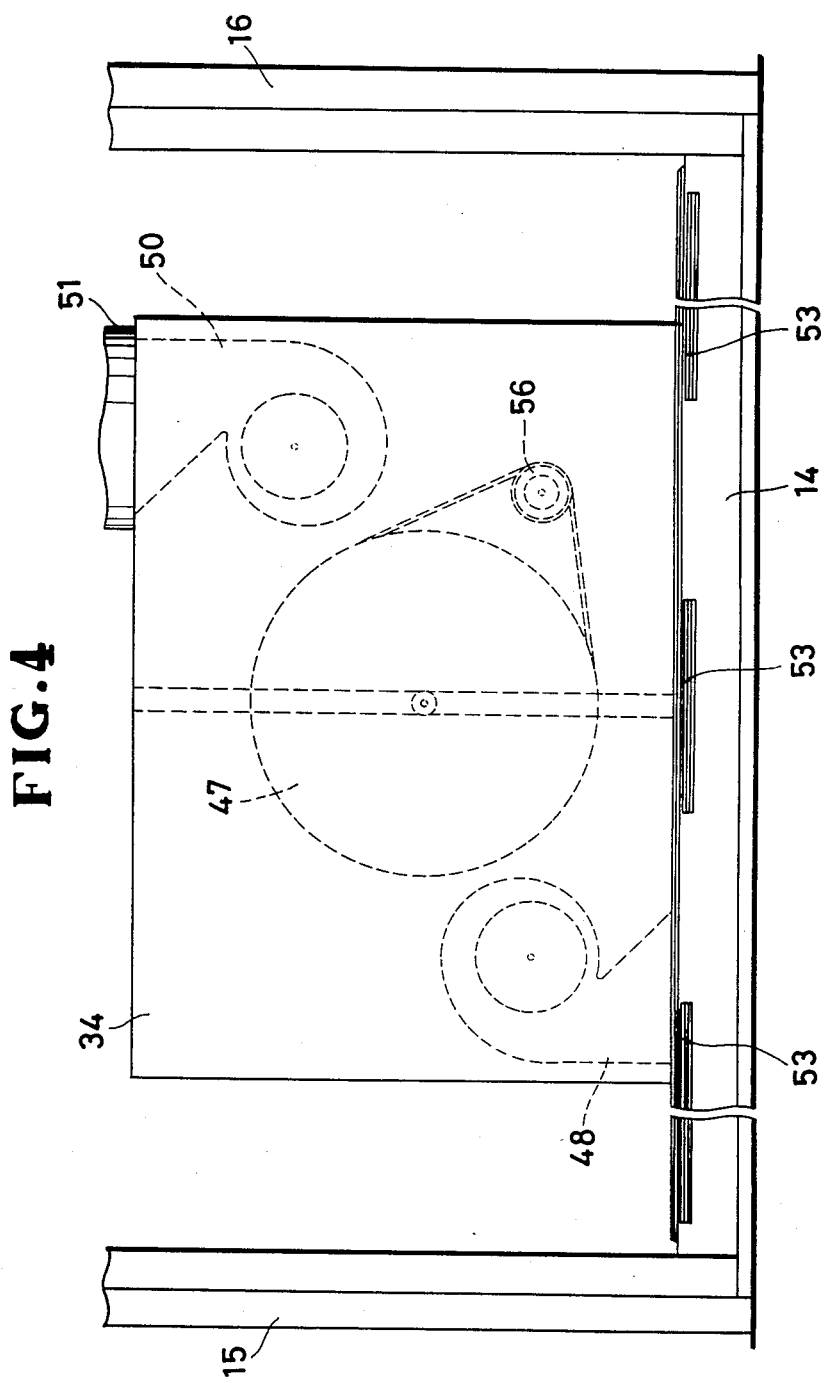

BAY WINDOW WITH VENTILATOR

BACKGROUND OF THE INVENTION

1. Field of the Invention

The present invention relates to a bay window for use in houses, which has a ventilator incorporated therein with a built-in heat exchanger.

2. Description of the Prior Art

One known ventilator with a built-in heat exchanger is disclosed in Japanese Laid-Open Patent Publication No. 59-74443 published on Apr. 26, 1984. The disclosed ventilator has a discharge passage for delivering air from an interior side to an exterior side and a supply passage for delivering air from the exterior side to the interior side. A heat transfer takes place between the two air flows as they pass through a rotor which rotates at a low speed in the ventilator.

The prior ventilator which is attached to a wall or a window frame of a house room is unsightly to view. Since the ventilator is exposed to the interior, it may be too noisy, collects dust, and interferes with activities of occupants of the room.

SUMMARY OF THE INVENTION

It is an object of the present invention to provide a bay window with a ventilator accommodated in a cupboard or housing thereof below a bay window shelf and concealed from an interior side of the window.

According to the present invention, a bay window includes a frame assembly composed of an inner head, an inner transom, an inner sill, an outer head, an outer transom, an outer sill, a middle horizontal panel interconnecting the inner and outer transoms, and a lower horizontal panel interconnecting the inner and outer sills. The inner sill has air inlets opening into a house interior space, and the inner transom has air outlets opening into a house interior space. The bay window also has a window unit disposed between the outer head and the outer transom, and a housing or bay window cupboard disposed between the middle and lower horizontal panels. A ventilator is accommodated in the housing and has an air inlet port communicating with the air inlets and an air outlet port communicating with the air outlets. The lower horizontal panel supports an air discharge duct communicating through a heat exchanger rotor with the air inlet port, and an air supply duct communicating through the heat exchanger rotor with the air outlet port. In operation, air from the house interior space flows through the air inlets, a first inner chamber in the ventilator, the rotor, a first outer chamber in the ventilator, a discharge fan, and the air discharge duct into the exterior side of the bay window. At the same time, air from the exterior side of the bay window flows through the air supply duct, a second outer chamber in the ventilator, the rotor, a second inner chamber in the ventilator, a supply fan, the air supply duct, and the air outlets into the house interior space. When the air flows from the interior and exterior sides pass through the rotor, heat in the form of sensible heat and latent heat is transferred between the air-flows.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4 is a front elevational view of a ventilator positioned in the bay window cupboard.

DETAILED DESCRIPTION

Figure 1:
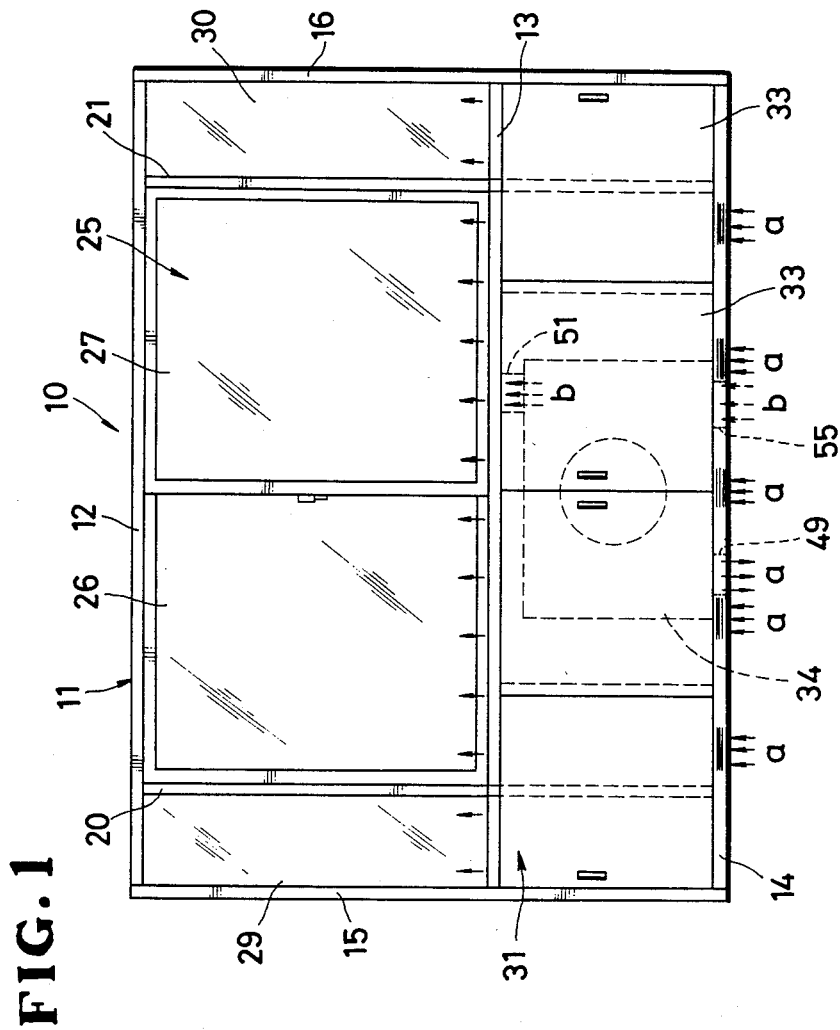
FIG. 1 is a front elevational view of a bay window according to the present invention, as seen from the interior side thereof.

The principles of the present invention are particularly useful when embodied in a bay window, generally indicated by the reference numeral 10, as shown in FIG. 1.

Figure 2:
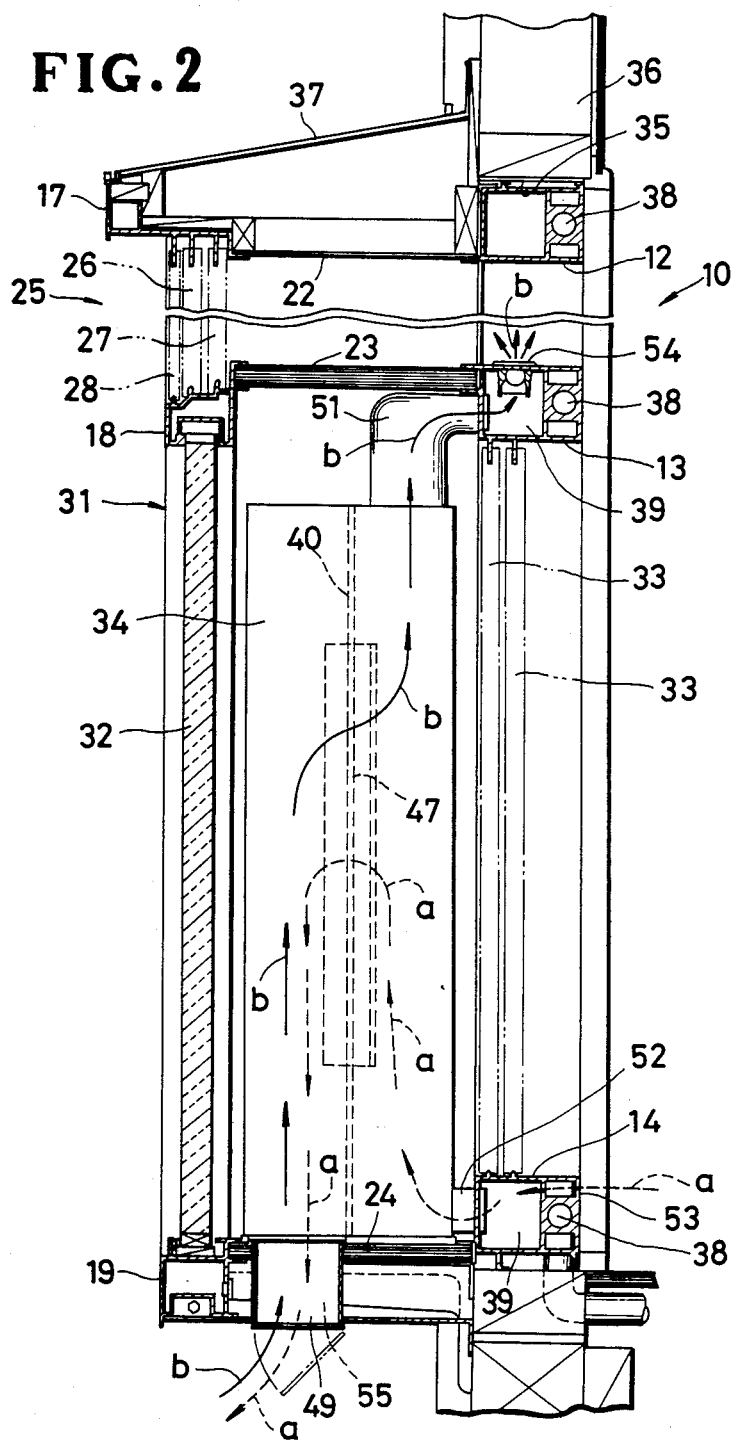
FIG. 2 is a fragmentary vertical cross-sectional view of the bay window unit shown in FIG. 1.
Figure 3:
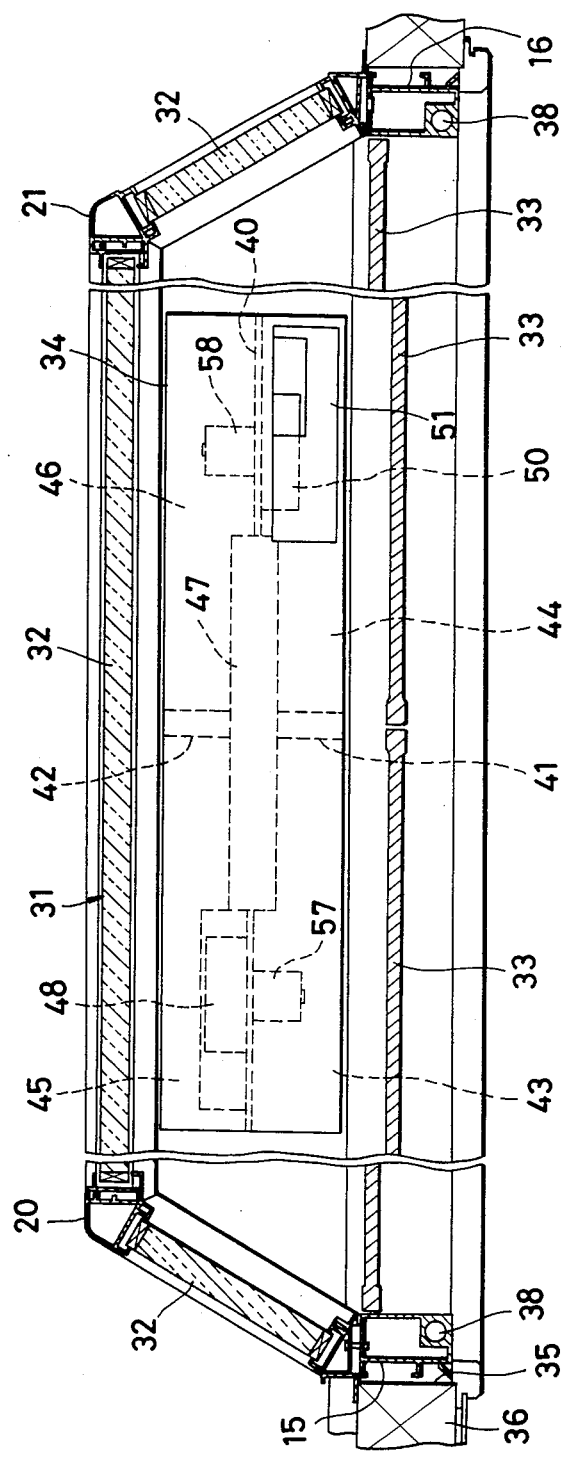
FIG. 3 is a fragmentary horizontal cross-sectional view of a cupboard or shelf housing of the bay window.

As shown in FIG. 1, the bay window 10 comprises a frame assembly 11 composed of an inner head 12, an inner transom 13, an inner sill 14, and a pair of horizontally spaced inner side jambs 15, 16 which are interconnected by suitable fasteners. As shown in FIGS. 2 and 3, the frame assembly 11 also has an outer head 17, an outer transom 18, an outer sill 19, and a pair of horizontally spaced outer side jambs 20, 21 (FIG. 3) which are interconnected by suitable fasteners.

As shown in FIG. 2, the inner head 12, the inner transom 13, and the inner sill 14 are coupled respectively to the outer head 17, the outer transom 18, and the outer sill 19 by an upper horizontal panel 22, a middle horizontal panel or shelf 23, and a lower horizontal panel 24, respectively. The bay window 10 also includes a window unit 25 disposed between the outer head 17 and the outer transom 18. The window unit 25 is composed of a pair of horizontal sliding window sashes 26, 27 which are horizontally slidable along the outer head 17 and the outer transom 18. The window unit 25 also has a screen sash 28 disposed between the outer head 17 and the outer transom 18 exteriorly of the sliding window sashes 26, 27, and a pair of fixed window sashes 29, 30 (FIG. 1) disposed respectively between the inner and outer side jambs 15, 20 and between the inner and outer side jambs 16, 21. The bay window 10 further includes a cupboard or housing 31 disposed between the middle horizontal panel 23 and the lower horizontal panel 24. The bay window cupboard 31 has outer insulation panels 32 extending vertically between the outer transom 18 and the outer sill 19, and a plurality of inner sliding panels 33 disposed vertically between the inner transom 13 and the inner sill 14 and horizontally slidable between the inner side jambs 15, 16. The bay window cupboard 31 accommodates therein a ventilator 34 which will be described later on.

The bay window 10 is installed in an opening 35 defined in a house wall 36. A roof 37 is attached to the outer surface of the house wall 36 in overlying relation to the bay window 10.

The outer head 17, the outer transom 18, the outer sill 19, and the outer side jambs 20, 21 are preferably in the form of thermally insulating structural members such as of synthetic resin or aluminum for reduced heat transmission. The inner side jambs 15, 16 are also preferably in the form of thermally insulating structural members of synthetic resin or aluminum for thermally separating the exterior and interior sides of the bay window 10.

As illustrated in FIGS. 2 and 3, each of the inner head 12, the inner transom 13, the inner sill 14, and the inner side jambs 15, 16 has a conduit 38 of a circular cross section extending longitudinally therethrough for the passage of a heat-transfer liquid such as hot water or cold water for heating or cooling the interior of the house. Each of the inner transom 13 and the inner sill 14 also has an air passage 39 defined therein.

More specifically, the ventilator 34 has an interior space divided by a central partition 40 and a pair of inner and outer partitions 41, 42 into a first inner chamber 43, a second inner chamber 44, a first outer chamber 45, and a second outer chamber 46. A heat exchanger rotor 47 is rotatably disposed substantially centrally in the central partition 40 between the inner and outer partitions 41, 42, the heat exchanger rotor 47 facing all of the chambers 43 through 46. The ventilator 34 also has a discharge fan 48 positioned in a lower portion of the first outer chamber 45 and having an outlet connected to an air discharge duct 49 mounted on the lower horizontal panel 24 (FIG. 2) and communicating with the exterior side of the bay window 10. The ventilator 34 also has a supply fan 50 positioned in an upper portion of the second inner chamber 44 and having an outlet connected to an air outlet duct or port 51 communicating with the air passage 39 in the inner transom 13. The first inner chamber 43 communicates through an air inlet port 52 with the air passage 39 in the inner sill 14 which has a plurality of air inlets 53 disposed along the length of the sill 14 at equal intervals and opening into the interior side of the bay window 10. The inner transom 13 has, along the length thereof, a plurality of air outlets 54 at equal intervals. The air passage 39 in the inner transom 13 communicates with the interior side of the bay window 10 through the air outlets 54. The second outer chamber 46 communicates with the exterior side of the bay window 10 through an air supply duct 55 mounted on the lower horizontal panel 24.

Operation of the ventilator 34 is as follows: The heat exchanger rotor 47 is rotated slowly by a motor 56 (FIG. 4) and the discharge and supply fans 48, 50 are driven by respective motors 57, 58 (FIG. 3). Air from the interior side of the bay window 10 flows in the direction of the arrows a through the air inlets 53, the lower air passage 39, the first inner chamber 43, the rotor 47, the first outer chamber 45, the discharge fan 48, and the air discharge duct 49 into the exterior side of the bay window 10. At the same time, air from the exterior side of the bay window 10 flows in the direction of the arrows b through the air supply duct 55, the second outer chamber 46, the rotor 47, the second inner chamber 44, the supply fan 50, the supply duct 51, the upper air passage 39, and the air outlets 54 into the interior side of the bay window 10. While the air-flows from the interior and exterior sides pass through the rotor 47, heat in the form of sensible heat and latent heat is transferred between the air-flows. When the interior of the house is cooled, the air discharged from the interior side and the air introduced from the exterior side are cooled by the heat-transfer liquid flowing through the conduits 38 in the inner transom 13 and the inner sill 14. When the interior of the house is warmed, the air discharged from the interior side and the air introduced from the exterior side are warmed by the heat-transfer liquid flowing through the conduits 38. Therefore, the air-conditioning effect is not impaired by the air drawn by the ventilator 34 into the interior of the house.

Although various minor modifications may be suggested by those versed in the art, it should be understood that we wish to embody within the scope of the patent warranted hereon, all such embodiments as reasonably and properly come within the scope of our contribution to the art.

What is claimed is:

1. A bay window for attachment to a wall defining a house interior space, comprising:

(a) a frame assembly including an inner head, an inner transom, an inner sill, and a pair of horizontally spaced inner side jambs which are connected together, an outer head, an outer transom, an outer sill, and a pair of horizontally spaced outer side jambs which are connected together, a middle horizontal panel interconnecting said inner and outer transoms, and a lower horizontal panel interconnecting said inner and outer sills, said inner side jambs having a thermally insulating structure, each of said inner head, said inner transom, said inner sill and said inner side jambs having a conduit extending longitudinally therethrough for passage of heat-transfer liquid, each of said inner transom and said inner sill further having an internal air passage disposed in heat-exchange relation to said conduit thereof, said inner transom having air outlets opening into the house interior space, said inner sill having air inlets opening into the house interior space, said outer head, said outer transom, said outer sill and said outer side jambs all having a thermally insulating structure;

(b) a window unit disposed between said outer head and said outer transom;

(c) a housing disposed between said middle and lower horizontal panels and including at least one thermally insulating panel extending vertically between said outer head and said outer sill;

(d) a ventilator accommodated in said housing and having an air inlet port communicating with said air inlets through said air passage in said inner sill, and an air outlet port communicating with said air outlets through said air passage in said inner transom, said ventilator further having a heat exchanger rotor; and (e) an air discharge duct and an air supply duct both supported on said lower horizontal panel, said air discharge duct communicating with said air inlets successively through said heat exchanger rotor, said air inlet port and said air passage in said inner sill, said air supply duct communicating with said air outlets successively through said heat exchanger rotor, said air outlet port and said air passage in said inner transom.

* * * * *